Sept. 19, 1950 W. VAN BENSCHOTEN 2,522,974
CLUTCH MECHANISM
Filed Oct. 18, 1946 2 Sheets-Sheet 1

INVENTOR.
Walter Van Benschoten
BY
Lynn N Latta
ATTORNEY

Sept. 19, 1950     W. VAN BENSCHOTEN     2,522,974
CLUTCH MECHANISM
Filed Oct. 18, 1946     2 Sheets-Sheet 2
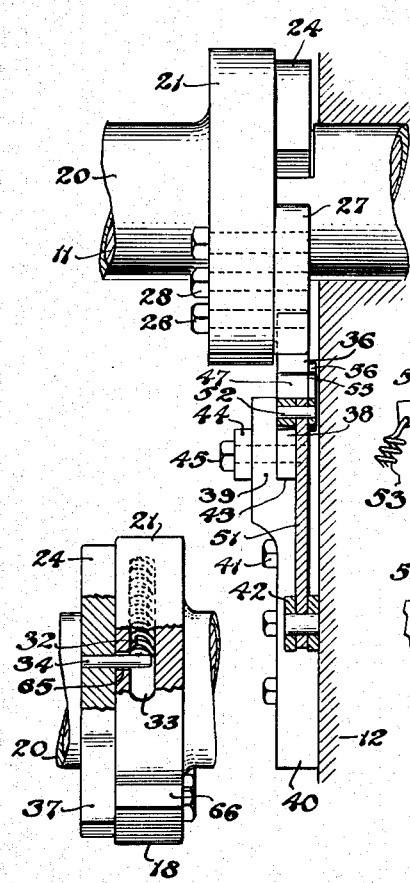
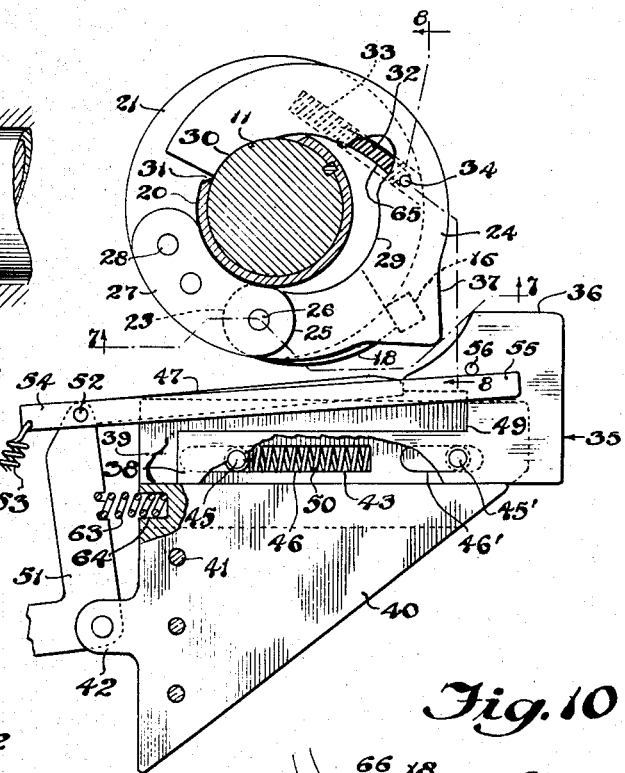
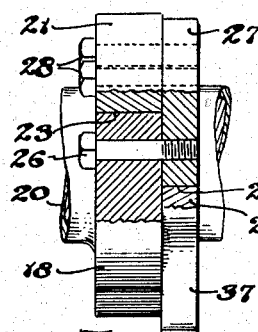
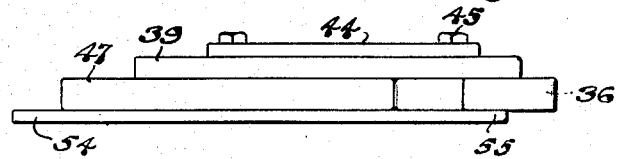
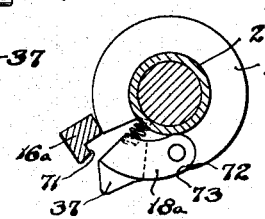
INVENTOR.
Walter Van Benschoten
BY Lynn A Latta
ATTORNEY Patented Sept. 19, 1950

2,522,974

UNITED STATES PATENT OFFICE 2,522,974

CLUTCH MECHANISM

Walter Van Benschoten, Santa Monica, Calif.

Application October 18, 1946, Serial No. 703,949

13 Claims. (Cl. 192—28)

1

This invention relates to machine tool clutches. The general object of the invention is to provide a clutch that will, in response to a manual initiating operation, transmit power from a driving member to a driven member throughout one revolution of the driving member, and then disconnect the driven member from the driving member.

While the invention is applicable to various types of machine in which power is intermittently transferred from a constantly rotating driving member to a driven member, it is particularly useful in connection with transferring power from the flywheel to the crankshaft of a punch press or the like. In a punch press, one of the major elements of hazard to the operator is the possibility of an unexpected second cycle of operation which, in the conventional punch press, will result from failure to take the foot off the control treadle when a cycle of operation has been completed. In many punching operations it is necessary for the operator to insert his fingers between the dies of the press in order to remove a finished piece of work or to insert a fresh piece of material to be punched. An unexpected second cycle of operation can easily sever the fingers under such circumstances.

In view of the foregoing, an important object of my invention is to provide a punch press having an improved safety factor resulting from automatic de-clutching at the end of one cycle of operation, irrespective of whether the treadle is released or not.

While there have been a number of prior proposals for the provision of such automatic de-clutching, the mechanisms of these prior proposals were not fully satisfactory. Some of them are unduly complicated. Others are not sufficiently rugged to endure the strenuous conditions of operation of such a mechanism. My invention avoids these objections by providing a clutch mechanism which is at the same time both simple and extremely sturdy in construction and capable of withstanding the shock loads of intermittent punch press operation over long periods of time without breaking down.

A clutch of this general class must, to be satisfactory, be of the positive or jaw clutch type. The jaws which transmit the momentum of the rotating flywheel through the crankshaft to the ram of the press must be capable of withstanding the exceedingly high shock loads arising from the inertia of the crankshaft and ram. The mountings for these jaws must likewise be capable of withstanding these high shock loads.

2

Conventional punch press clutches usually embody a key in the crankshaft or a longitudinally shiftable bolt, as the movable clutch jaw. Such devices are subject to frequent breakage or shearing of the key or bolt. My invention aims to avoid these difficulties, and, to this end, contemplates the location of the clutch jaws at a substantial distance from the axis of rotation, and the hinging of the jaw to the clutch hub for radial shifting movement between clutching and nonclutching positions and for direct circumferential transmission of force from the driving member to the driven member. This arrangement may be attained by constructing the jaw as a circumferentially disposed segment of a radial flange of the clutch hub, the flange being recessed to receive the jaw. Another important characteristic of the invention in attaining ample capacity for handling the shock loads of clutch engagement is the arrangement of the jaw for direct abutting engagement of its hinged end with a radial wall of the hub recess in which it is received, whereby the shock loads are transmitted through the end to end abutting engagement of the jaw and the flange, with the jaw and abutting portion of the flange in substantially circumferential alignment.

Another object of the invention is to provide means for absorbing the radial component of the loads that are transmitted through the jaw, and to avoid excessive radial components. One aspect of the invention resides in the use of an arcuate tail member, rigidly attached to the jaw, partially encircling the hub or crankshaft and engageable therewith for limiting radial projection of the jaw. As to radial components, the invention provides for constructing the engaging end of the jaw at an angle which is such as to avoid an outward component sufficient to strain the tail member or other stop means, and such as to avoid an inward component sufficient to retract the jaw.

Another object of the invention is to provide for positively stopping the rotation of the crankshaft at precisely the position from which a cycle of operation is started, through the use of means which is sturdy and capable of taking the shock loads of such stopping, without breaking down.

A further object is to provide a clutch mechanism which can be quickly detached from a power machine for repair or replacement in the event of breakdown.

A further object of the invention is to provide a relatively simple, yet thoroughly dependable and positively operable, control mechanism for the clutch. Such clutch control mechanism includes a shiftable abutment member or blocker and a positively actuated trigger for temporarily shifting the blocker out of engagement with a radially projecting part of the clutch hub assembly.

An important characteristic of the invention, in the control mechanism, is the constant biasing of the blocker toward a blocking position, together with positive actuation of the trigger by the rotating clutch assembly in a manner to release the blocker for return to the blocking position, during the cycle of operation in which the clutch is engaged. The shifting of the trigger member to the position in which it holds the blocker in a non-blocking position is accomplished through the use of resilient means constantly biasing the trigger member toward this position, but the movement of the trigger member to a position in which it releases the blocker for return to its blocking position is a positive one, such that no possible failure of the mechanism, short of the complete destruction of the clutch jaw mechanism, could possibly prevent the release of the blocker for return to its blocking position.

In furtherance of the general object of attaining simplicity and compactness, the invention provides for utilizing the stop finger of the shiftable clutch jaw for the secondary function of engaging the trigger to positively release the abutment members. The parts are so arranged that this release occurs at an early stage in the cycle of punch press operation, providing ample time for the blocker to return to its blocking position. This characteristic of the invention provides an added factor of safety in the releasing of the clutch.

Other objects of the invention will become apparent in the ensuing specifications taken in connection with the appended drawings, in which:

Fig. 4 is a sectional view of the clutch and clutch release mechanism taken on the line 4—4 of Fig. 2;

Fig. 5 is a view of the mechanism taken from the side opposite to that viewed in Figs. 1, 2, and 3;

Fig. 6 is a plan view of the trigger mechanism and associated parts;

Fig. 7 is a view, partially in section, showing the abutting engagement of the end of the shiftable jaw and the clutch hub flange taken on the line 7—7 of Fig. 5;

Fig. 8 is a view, partially in section, showing the yielding pawl-biasing means, taken on the line 8—8 of Fig. 5;

Fig. 9 is a side view of a clutch embodying a modified form of the invention; and Fig. 10 is a diagram of the shiftable jaw.

Figure 1:
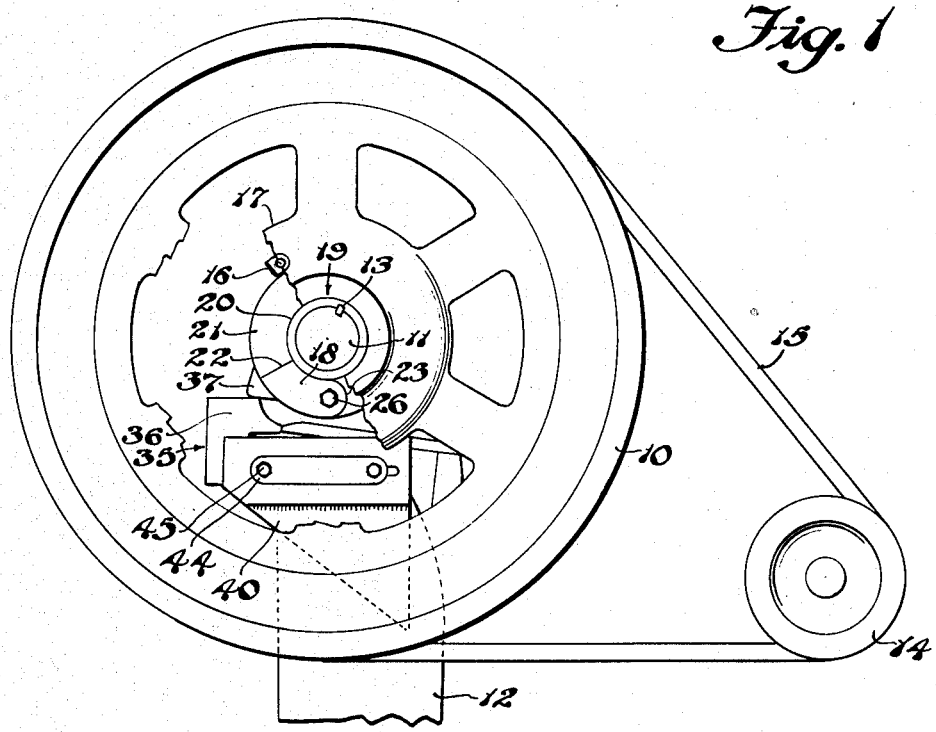
Fig. 1 is a side view of the head portion of a punch press embodying the invention, shown in the de-clutched or idling position.

As an example of one form in which my invention may be embodied, I have shown in the drawings a clutch mechanism embodied in a punch press having a flywheel 10 journaled upon a hub bushing 20 which is keyed at 13 to a crankshaft 11. The crankshaft 11 is journaled in the press frame, a portion of which is indicated at 12. From a motor driven pulley 14 power is transmitted to the flywheel 10 through a drive belt 15. From the flywheel 10, thus constantly rotated as long as the motor is in operation, power may be intermittently transmitted to the crankshaft 11 through the clutch mechanism forming the subject matter of my invention.

My improved clutch mechanism includes a flywheel dog 16 securely mounted in the hub 17 of the flywheel 10 and a shiftable jaw 18 which is carried by the clutch hub 19. The clutch hub 19 includes the central bushing 20 (which is keyed to the crankshaft 11 as previously described) and a radial flange portion 21 which is formed integrally with or welded to the bushing 20 and projects radially outwardly therefrom. The flange 21 is circumferentially continuous except for a gap 22 in which the shiftable jaw 18 is received. One end of the jaw 18 is semi-circular, and is in pivotal abutting engagement with a semi-circular end surface 23 of the flange 21. The jaw 18 is pivoted to the clutch hub 19 on a center concentric with the curved end surface 23 so that it may maintain its abutting engagement with the surface 23 when in its extended position engaged by the rotating jaw 16, as in Figs. 2 and 3. Consequently, the loads are transmitted from the flywheel to the clutch hub in a substantially circumferential direction through the jaw 18 and from the jaw 18 to the hub flange 21 through the aforesaid abutting engagement with the end surface 23.

The jaw 18 is rigidly secured to or formed integrally with an arcuate tail member 24 which embraces the crankshaft 11 and hub sleeve 20. A circular portion of the jaw 18 projects beyond an arcuate end surface 25 of the tail member 24 and is loosely pivoted upon a pivot pin 26 which extends therethrough and is threaded into a bracket 27. The bracket 27 is secured against the face of the flange 22 by means of machine screws 28. The curved end surface 25 of the tail member 24 abuts a correspondingly curved end surface of the bracket 27, this abutting engagement assisting in taking the circumferential loads transmitted through the clutch. The tail member 24 lies in substantially the same plane as the bracket 27 and is in sliding, face to face engagement with the face of the flange 21 to which the bracket 27 is secured. The jaw 18 lies in the plane of the flange 21. It will thus be apparent that the jaw, flange, tail member, and bracket lie in compact arrangement in two adjacent planes.

The space within the tail member 24 is generally oval, being such as to permit the tail member and jaw 18 to shift from a normal, retracted position in which an arcuate inner edge surface 29 (adjacent the hinge 26) engages the periphery of the hub sleeve 20 and the jaw 18 is removed from the path of rotation of the rotating jaw 16, to an extended position (shown in Fig. 5) in which the jaw 18 may be engaged by the dog 16 and an arcuate inner edge surface 30, at the free end of the tail member, abuts against the crankshaft 11. In order to permit such abutting engagement, the hub sleeve 20 is cut away to provide a notch 31, in which the free end portion of the tail member is receivable. It is to be understood, however, that with a somewhat larger diameter in the flange 21 and tail member 24, the end of the tail member may be arranged to engage against the hub sleeve 20 instead of the crankshaft 11. In either case, such abutting engagement serves to take the radial component of the load transmitted to the jaw 18 from the jaw 16 and to limit the projecting movement of the jaw 18.

Projection of the jaw 18, when released for such movement, is accomplished by a compression spring 32 which is engaged under compression in a bore 33 in the flange 21, between the bottom of the bore 33 and a pin 34 which is mounted in the tail member 24 and projects through an arcuate slot 65 in the flange 21.

The movement of the tail member 24 and jaw 18 is controlled by a shiftable abutment member or blocker 35 which has an upwardly projecting blocking portion 36 normally resting in the path of rotation of a stop finger 37 which projects radially from the periphery of the tail member 24. The blocker 35 includes a horizontal slide portion 38 which is in slidable, face to face engagement with one side of a horizontal flange 39 on the upper end of a bracket 40 which is secured, as by means of several machine screws 41 passing therethrough, to the press frame 12. The flange 39 is offset laterally from the plane of the body of the bracket 40 in order to provide at the upper extremity of said body, a shoulder 43 to which the shock loads imposed upon the blocker 35 in stopping the rotation of the crankshaft, may be transmitted. A satisfactory method of fabricating the bracket 40 and flange 39 is to weld the flange to a side face of the bracket. The slide member 38 is held in engagement with the flange 39 by any suitable means such as the plate 44, secured to the slide member 38 by machine screws 45 and 45' projecting through elongated slots 46 and 46' in the flange 39, and threaded into the slide member 38.

Figures 2, 3:
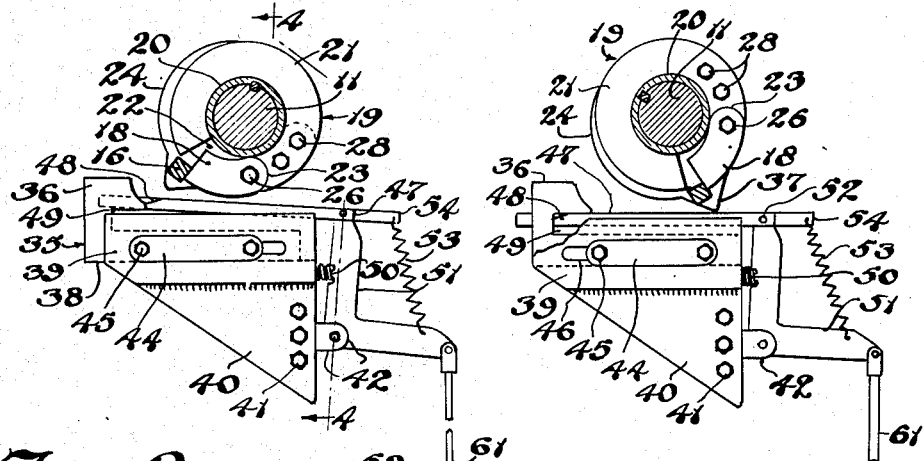
Fig. 2 is a side view, partially in section, of the clutch and clutch control mechanism, shown in an early stage of press operation, immediately following clutch engagement.
Fig. 3 is a side view, partially in section, of the clutch mechanism and clutch control mechanism with the parts in their positions attained just subsequently to the release of the shiftable abutment member for return to obstructing positions.

The control mechanism includes a trigger 47, having a beveled end 48 that is receivable in a notch 49 in the blocker 35, in order to permit the blocker to assume a normal, retracted position disposed in the path of rotation of the stop finger 37 as shown in Figs. 1 and 3. The blocker 35 is urged toward this position by a coil spring 50 which is disposed, under compression, between the pin 45 and an end of the slot 46.

The trigger 47 is pivoted at 52 on the upper end of a bell crank lever 51 which is pivoted between a pair of spaced ears 42 on the bracket 40. The beveled end 48 of the trigger 47 is biased upwardly by a tension spring 53 operating between the horizontal arm of the lever 51 and an extension 54, beyond the pivot 52, of the trigger 47. This extension 54 may take the form of a separate bar welded or otherwise secured to the side of the trigger 47. This bar also provides an extension 55 at the other end of the trigger which functions, by engaging beneath a pin 56 projecting from the face of the abutment portion 36, to limit the upward movement of the free end 48 of the trigger at a position in which it abuts the inner extremity of the blocker shoulder 36 and thereby holds the latter in the projected position out of the path of movement of the rotating jaw 16 as shown in Fig. 2.

Control movement is transmitted from a treadle 57 to the trigger 47 through linkage including a pullrod 58, a rocker arm 59 fulcrumed to the frame 12 at 60, a pushrod 61, the bell crank lever 51 and the spring 53. The treadle 57 is fulcrumed at 62 to the base of the press or to any suitable floor-supported bracket. The lever 51 is urged in trigger-retracting direction by a coil spring 63 engaged under compression between the lever 51 and a bore 64 in the bracket 40, in which its one end is pivoted. Since the coil spring 63 reacts against the fixed bracket 40, it will constantly oppose depression of the treadle 57, and will return the treadle 57 and the linkage 58—62, to normal positions, as well as shifting the bell crank lever 51 in the clockwise direction as viewed in Figs. 2 and 3, whenever the treadle 57 is released.

In the operation of the invention, when the treadle is depressed, the pullrod 58 will be moved downwardly and the pushrod 61 moved upwardly, oscillating the bell crank lever 51 counter-clockwise as viewed in Figs. 2 and 3, and (with the end of the trigger 47 engaging the blocker shoulder 36) pushing the blocker 35 to the projected position out of the path of movement of the finger 37. With the finger 37 thus released, the shiftable jaw 18 will move from its retracted position shown in Fig. 1 to its projected position shown in Figs. 2 and 3, such movement being limited by contact of the free end of the tail member with the crankshaft 11. The clutch dog 16 will, as it rotates, arrive at a position where it will engage the projected end of the jaw 18 and transmit rotation through jaw 18 and clutch hub 19 to the crankshaft 11. In Fig. 2 the parts are shown in their positions just subsequent to clutch engagement. As the clutch hub rotates, the finger 37 will engage the trigger 47 and push it downwardly until the beveled end 48 enters the notch 49. Thereupon the spring 50 will retract the abutment member to its blocking position. This brings the parts to the positions shown in Fig. 3. As the crankshaft nears the end of one complete revolution, the finger 37 will engage the blocker shoulder 36 and continued rotation of the clutch hub will cause the tail member 24 to be pushed back to the declutching position shown in Fig. 1. When this position is reached, the engagement of the tail member and jaw 18 with the under surface of the hub sleeve 20 will provide a rigid abutment between the hub and the abutment shoulder 36, instantly and positively stopping the rotation of the crankshaft. With the jaw 18 withdrawn from its path of rotation, the flywheel dog 16 may continue to circle about the clutch hub until a subsequent movement of the blocker shoulder 36 back to its non-blocking position permits a second cycle of operation. As long as the treadle 57 is depressed, the free end of the trigger 47 will be confined in the notch 49 of the blocker member 35, and the blocker shoulder will remain in its blocking position. In order to initiate another cycle of operation, it is necessary to release the treadle 57, whereupon spring 63 will move the bell crank lever 51 clockwise, drawing the trigger 47 to the right as viewed in Fig. 2, until the bevelled end of 48 of the trigger is withdrawn from the notch 49. It will be understood that the lever 51 is capable of moving clockwise to a sufficient extent to clear the bevelled end 48 from the notch 49, when the abutment 36 is in the blocking position of Fig. 3. Thereupon the bevelled end 48 will be tilted upwardly by the action of the spring 53 pulling downwardly against the extension 54. This brings the bevelled end 48 into opposed relation to the nose of the abutment shoulder 36, and consequently the mechanism is reset with the parts in the positions indicated in Fig. 1 with the parts in the positions shown in Fig. 1, for subsequent operation. Upon again depressing the treadle 57, the trigger 47 will shift the blocker 35 to the non-blocking position in the manner previously described, and another cycle of operation will ensue.

The engaging end 66 of the pawl 18 is disposed at an angle such that the outward radial component of thrust is insufficient to overload the tail member, and the inward radial component of thrust is insufficient to overcome the biasing force of the spring 32. I find that this is satisfactorily accomplished when the end 66 lies in the neighborhood of 90 degrees to the bisector 67 of the angle between a line 68 passing through the hinge axis of the jaw and through the center O of contact between the jaw and dog, and the tangent 69 to the circumference of revolution of the center O.

It is to be understood that the end face of the jaw may diverge a few degrees to either side of the 90 degree angle, and that such divergence may vary in accordance with variations in the coefficient of friction between the jaw and dog, which in turn may vary with variations in the metal of which the jaw and dog are constructed.

In the form of the invention shown in Fig. 9, the shiftable jaw 18a, instead of having an arcuate tail member as a stop means, is limited in its radial projection, by a shoulder 71 on the flywheel dog 16a. Prior to engagement of the dog 16a and jaw 18a, projection is limited by a shoulder 72 on the hub flange 21a, engaging a shoulder 73 on the jaw.

I claim:

1. Clutch mechanism for intermittently transmitting power from a constantly rotatable driving member of a power machine to a driven member thereof, comprising a dog rotating with said driving member in an orbit outside the periphery of the driven member, a shiftable jaw pivoted to the driven member for outward movement from a non-clutching position withdrawn from said orbit to a clutching position intersecting said orbit, and control means including a blocker member shiftable between blocking and non-blocking positions in which it is respectively interposed in and withdrawn from the path of rotation of a part rigidly associated with said shiftable jaw, said shiftable jaw having an arcuate tail portion at least partially encircling said driven member and adapted to engage the same at a point generally diametrically opposed to the clutching end of said jaw, to limit the movement of said shiftable jaw toward the clutching position.

2. Clutch mechanism for intermittently transmitting power from a constantly rotatable driving member to a driven member of a power machine, comprising a dog rotating with said driving member in an orbit outside the periphery of the driven member, a shiftable clutch jaw connected to the driven member for outward movement from a non-clutching position in which it is respectively withdrawn from said orbit to a clutching position intersecting said orbit, and a blocker member shiftable between blocking and non-blocking positions in which it is respectively interposed in and withdrawn from the path of rotation of a part rigidly connected with said shiftable jaw, said shiftable jaw having a rigidly associated tail member, at least partially encircling said driven member and adapted to engage the same at a point generally diametrically opposed to the position of said jaw to limit the movement of said shiftable jaw towards said clutching position.

3. Clutching mechanism for intermittently connecting a constantly rotatable driving member of a power machine to a driven member thereof, comprising a dog rotating with said driving member, a shiftable clutch jaw shiftably connected to said driven member for movement between clutching and non-clutching positions in which it is respectively interposed in and withdrawn from the path of rotation of said dog, and control mechanism including a radially projecting part rigidly associated with said shiftable jaw, a blocker shiftable between blocking and non-blocking positions in which it is respectively interposed in and withdrawn from the path of rotation of said radially projecting part, means yieldingly biasing said blocker toward the blocking position, and means manually operable to shift said blocker to the non-blocking position, said radially projecting part functioning as the result of engagement with said blocker, to shift said shiftable jaw to the non-clutching position and also functioning when released by said blocker, to engage said manually operable means during a cycle of rotation and to shift the same to an inoperative position in which said blocker is permitted to return to its blocking position under the action of said yielding means.

4. Clutch mechanism for intermittently connecting a constantly rotatable driving member of a power machine to a driven member thereof, comprising a dog rotating with said driving member, a shiftable jaw connected to said driven member for shifting movement between clutching and non-clutching positions in which it is respectively interposed in the path of rotation of said dog and withdrawn from said path, said jaw having an arcuate tail member at least partially encircling the driven member and adapted to engage the same to limit the movement of said shiftable jaw toward said clutching position, and control mechanism including a part projecting radially from said jaw and tail member, a blocker shiftable between blocking and non-blocking positions in which it is respectively interposed in and withdrawn from the path of rotation of said radially projecting part, means yieldingly biasing said blocker toward a blocking position, and means manually operable to shift said blocker to the non-blocking position, said projecting part functioning, as the result of engagement with said blocker, to cause the shifting of said jaw to its non-clutching position, and also functioning, when released by said blocker, during rotation following the consequent engagement of said jaw and dog, to positively move said manually operable means out of engagement with said blocker so as to permit the latter to shift back to its blocking position.

5. Clutch mechanism for intermittently connecting a constantly rotatable driving member of a power machine to a driven member thereof, comprising a dog rotating with said driving member, a shiftable jaw connected to said driven member for movement between clutching and non-clutching positions in which it is respectively interposed in and withdrawn from the path of rotation of said rotating jaw, and control mechanism including a part rigidly associated with and projecting radially from said shiftable jaw, a blocker shiftable between blocking and non-blocking positions in which it is respectively interposed in and withdrawn from the path of rotation of said projecting part, a manually shiftable member, and a trigger carried by said manually shiftable member and having a free end that is adapted to shift between an operative position in which it is adapted to transmit from said manually shiftable member to said blocker, movement of the latter to its non-blocking position, and an inoperative position in which it is withdrawn from operative association with said blocker, means yieldingly biasing said blocker toward its blocking position, means yieldingly biasing said trigger toward its operative position, and means carried by said blocker for restraining said trigger in the inoperative position until the trigger is retracted from the last-mentioned means by a retracting movement of said manually shiftable member.

6. Clutch mechanism for intermittently connecting a constantly rotatable driving member of a power machine to a driven member thereof, comprising a dog rotating with said driving member, a shiftable jaw connected to said driven member for movement from a clutching position in which it is interposed in the path of rotation of said rotating jaw to a non-clutching position in which it is withdrawn from said path of rotation, and vice versa, said shiftable jaw having an arcuate tail member at least partially encircling the driven member and adapted to make abutting engagement therewith to limit projection of said shiftable jaw to the clutching position, means yieldingly urging said shiftable jaw to the clutching position, and control mechanism including a part rigidly connected to and projecting radially from said jaw and tail member, a blocker shiftable between blocking and non-blocking positions in which it respectively is interposed in and withdrawn from the path of rotation of said projecting part, a manually shiftable member, a trigger pivoted to said member and having a free end swingable between an operative position in which it is engagable with said blocker to transmit thereto, from said manually shiftable member, movement to the non-blocking position, and an inoperative position in which it cannot thus engage the blocking member, means yielding biasing said trigger toward the operative position, means carried by said blocker for restraining the trigger in the inoperative position until moved away from the blocker by a retracting movement of said manually operable member, said projecting part functioning when engaged by said blocker to cause the retraction of said shiftable jaw to its non-clutching position as the driven member completes a cycle of revolution, then functioning to positively arrest the rotation of the driven member against said blocking member, and subsequently functioning, when released by said blocker, and upon resumed rotation brought about by the consequent re-engagement of said jaw and dog, to engage and positively move said trigger to its inoperative position and thereby causing said blocker to return to its blocking position.

7. Clutch mechanism for connecting a constantly rotatable driving member of a power machine to a driven member thereof, comprising a radial flange on said driven member, said flange having a jaw-receiving recess, a circumferentially extending shiftable jaw lying in said recess, pivoted to said flange, and having an arcuate tail member at least partially encircling said driven member and peripherally conforming to the periphery of said flange, said jaw and tail member being shiftable from a non-clutching position in which both lie within the extended periphery of said flange, and a clutching position in which said tail member and the free end of said jaw are projected radially beyond the periphery of said flange and said tail member engages said driven member to limit such radial projection, a dog carried by said driving member and rotating in a path closely adjacent the periphery of said flange, for engagement with said shiftable jaw when the latter is projected, whereby to transmit rotation to the driven member, a part rigidly associated with and projecting radially from said shiftable jaw and tail member, and control mechanism including a blocker shiftable between blocking and non-blocking positions in which it respectively obstructs and is withdrawn from the path of rotation of said projecting part, means yieldingly biasing said blocker toward its blocking position, and manually operable means for moving said blocker to its non-blocking position, said radially projecting part functioning by engagement with said blocker, to cause said shiftable jaw to move to its non-clutching position and, when said non-clutching position has been reached, to positively stop the revolution of the driven member against said blocker, and also functioning, when released from said blocker, and upon resumed rotation resulting from the consequent engagement of the clutch jaws, to engage and positively move said trigger to its inoperative position.

8. Clutch mechanism for connecting a constantly rotatable driving member of a power machine to a driven member thereof, comprising a radial flange on the driven member, said flange having a jaw-receiving recess, a circumferentially extending shiftable jaw received in said recess, and pivoted to said flange for movement from a non-clutching position disposed within the extended periphery of said flange to a clutching position in which its free end is projected radially beyond the periphery of the flange, means associated with said shiftable jaw for restricting the projecting movement of said jaw, a dog carried by the driving member and rotatable in a path closely adjacent the periphery of said flange, for clutching engagement with said shiftable jaw when the latter is projected, a part rigidly associated with and projecting radially from said shiftable jaw, a blocker shiftable between blocking and non-blocking positions in which it is respectively interposed in and withdrawn from the path of revolution of said projecting parts, means yieldingly urging said blocker in the blocking direction, manually operable means for shifting said blocking means to the non-blocking position, said projecting part functioning, by engagement with said blocker, to cause the shiftable jaw to be withdrawn to the non-clutching position and, when said position is reached, to positively arrest the rotation of the driven member against said blocker, and also functioning, when released by said blocking means, and upon resumed rotation resulting from the consequent engagement of the jaw members, to positively effect the return of said blocker to blocking position.

9. Clutch mechanism for connecting a constantly rotatable driving member of a power machine to a driven member thereof, comprising a dog rotating with the driving member, a shiftable clutch jaw connected to the driven member for movement between clutching and non-clutching positions in which it is respectively interposed in and withdrawn from the path of rotation of said dog, a fixed frame member, a blocker carried by said fixed frame member and shiftable between blocking and non-blocking positions in which it is respectively interposed in and withdrawn from the path of rotation of a part rigidly associated with and projecting from the driving member, means yieldingly biasing the blocker toward the blocking position, manually operable means for shifting the blocker to the non-blocker position, and means rotating with the driven member and positively operable on said manually operable means to render the same inoperative and effect return of the blocker to its blocking position.

10. Clutch mechanism as defined in claim 9, in which said blocker, when in its blocking position, is operative as a result of engagement with said part to positively stop the rotation of the driven member at the end of one cycle of operation of the machine.

11. Clutch mechanism for connecting a constantly rotatable driving member of a power machine to a driven member thereof, comprising a hub fixed to the driven member and having a circumferentially facing semi-circular abutment shoulder, a jaw loosely hinged to the hub, having a semi-circular hinged end adapted to make abutting engagement with said shoulder to transmit loads directly thereto, said jaw extending generally in a circumferential direction and adapted to be projected radially outwardly to a clutching position, and a dog rotating with the driving member in an orbit lying outwardly of the periphery of said hub and engageable with the projecting end of the jaw in the clutching position thereof.

12. Clutch mechanism for connecting a constantly rotatable driving member of a power machine to a driven member thereof, comprising a bracket attachable to the frame of the machine, having an upwardly extending flange and a horizontal, upwardly facing sholder at the base of said flange, a blocker slidable on said shoulder, a jaw hinged to the driven member and adapted to be radially projected to a clutching position, a part rigidly attached to said jaw and adapted to engage said blocker to positively arrest rotation of the driven member and to move the jaw to a retracted position, means yieldingly biasing the jaw to the projected position, means yieldingly biasing the blocker to a blocking position, and manually operable means to move the blocker to a non-blocking position releasing said part for rotation of the driven member.

13. Clutch mechanism for connecting a constantly rotatable driving member of a power machine to a driven member thereof, comprising a hub fixed to the driven member, a jaw hinged to said hub for outward radial projection from a retracted, non-clutching position to a projected, clutching position, a dog rotating with the driving member and engageable with said jaw in the projected position thereof, means for temporarily limiting the radial projection of the jaw, and a shoulder on said dog for limiting the radial projection of the jaw under the radial component of thrust between the dog and jaw.

WALTER VAN BENSCHOTEN.

REFERENCES CITED

The following references are of record in the file of this patent:

UNITED STATES PATENTS

| Number | Name | Date |
| --- | --- | --- |
| 1,025,043 | Allen | Apr. 30, 1912 |
| 1,630,882 | Zeh | May 31, 1927 |
| 1,710,705 | Loshbough | Apr. 30, 1929 |
| 1,872,132 | Falleson | Aug. 16, 1932 |
| 1,987,742 | Lawrence | Jan. 15, 1935 |
| 2,178,205 | Johnson | Oct. 31, 1939 |